United States Patent [19]

Sander et al.

[11] 3,869,336

[45] Mar. 4, 1975

[54] TRANSFER SHEETS FOR TRANSFER PRINTING

[75] Inventors: Pierre Sander; Christian Mullier, both of Tourcoing, France

[73] Assignee: Trentesaux-Toulemonde S.A., Tourcoing, France

[22] Filed: Dec. 7, 1972

[21] Appl. No.: 311,725

Related U.S. Application Data

[63] Continuation of Ser. No. 75,988, Sept. 28, 1970, abandoned.

[30] Foreign Application Priority Data

Sept. 26, 1969  Switzerland...................... 14585/69
Aug. 6, 1970  Switzerland...................... 11832/70

[52] U.S. Cl................ 161/146, 117/3.1, 117/3.3, 117/3.4, 117/71 R, 117/76 P, 117/76 F, 161/167, 161/220, 161/406

[51] Int. Cl................... B41m 3/12, B32b 7/06

[58] Field of Search .......................... 117/3.1–3.4, 117/68.5, 71 R, 76 P, 76 F; 161/406, 146, 167, 220; 156/230; 260/1 S

[56] References Cited

UNITED STATES PATENTS

| | | | |
|---|---|---|---|
| 2,532,011 | 11/1950 | Dahlquist........................ | 117/68.5 X |
| 2,556,078 | 6/1951 | Francis............................ | 117/3.4 X |
| 2,730,459 | 1/1956 | Holmen et al...................... | 117/76 |
| 3,235,395 | 2/1966 | Scharf............................ | 117/3.1 X |

*Primary Examiner*—Harry J. Gwinnell
*Attorney, Agent, or Firm*—Wenderoth, Lind & Ponack

[57] ABSTRACT

A transfer sheet for transfer printing which comprises a paper of regenerated cellulose substrate carrying on at least one of its faces a detachable film layer containing a pattern or design, said film being separated from the substrate by a layer comprising a mixture of nitrocellulose and an aminoplastic.

19 Claims, 1 Drawing Figure

PATENTED MAR 4 1975      3,869,336
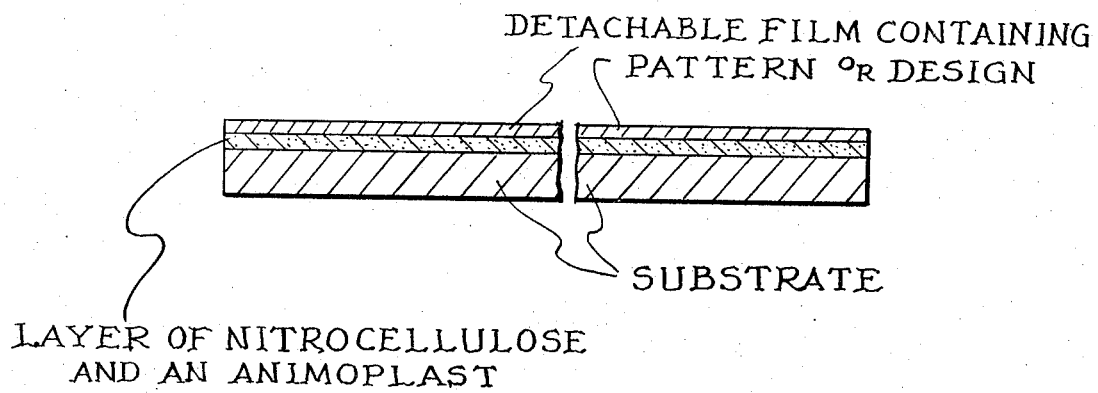
INVENTORS
PIERRE SANDER AND
CHRISTIAN MULLIER
BY
*Wenderoth, Lind & Ponack*
ATTORNEYS

TRANSFER SHEETS FOR TRANSFER PRINTING

This is a Continuation of application Ser. No. 75,988, filed Sept. 28, 1970 now abandoned.

The present invention relates to transfer sheets used in transfer printing.

Certain materials are prevented from being printed directly because of their shape or their lack of dimensional stability. Recourse is then made to transfer printing. Thus, for example, to print bottles or films of polyvinyl chloride, a temporary carrier is first used, to which the desired design or pattern can easily be applied, and this pattern is then transferred from the temporary carrier onto the definitive carrier i.e. the bottle or film.

It is known to use a temporary carrier consisting of an aluminium foil coated with a layer of ethylcellulose, onto which the pattern to be transferred is printed, the ethylcellulose preventing the film to be transferred from adhering too strongly to the aluminium foil. Temporary carriers of this type are, for example, described in French Patent 1,479,358. These carriers, however, have, inter alia, the following disadvantages. The strength of the very thin aluminium foils is insufficient and if the strength is improved by increasing the thickness of the foil or by gluing it to a strip of paper, the cost becomes prohibitive. Furthermore, the thermal conductivity of aluminium is so great that in some cases it causes imperfect transfers because of excessively rapid cooling in the moulds in which the transfers are effected. For these reasons, and for economy, attempts have been made to replace the aluminium foil by a sheet of paper.

The present invention provides a temporary carrier which comprises a sheet, ribbon or strip of paper or of regenerated cellulose, preferably a slightly porous or nonporous paper, for example a coated paper or a highly calendered paper, which carries a fine and flawless layer of a mixture of nitrocellulose and an aminoplastic. The pattern or design to be transferred, which in general consists of a pigmented layer of a vinyl chloride polymer or copolymer, is printed onto this temporary carrier thus forming the transfer sheet.

As an example of papers which can be considered for the preparation of the new transfer sheets the present invention, there may especially be mentioned highly calendered kraft papers as well as similar papers of this type.

To prepare the temporary carriers, a thin, flawless layer of a mixture of nitrocellulose and a curable aminoplast is first of all deposited on one of the faces of the paper by means of engraved cylinders or by any other appropriate means (e.g. rotagravure, photogravure or offset); from 1 to 10 g, preferably from 2 to 7 g, of the mixture per m² of paper can be deposited and deposition may be carried out in one or more stages. A varnish, an emulsion or a solution of the mixture in a volatile organic solvent will preferably be used. After drying and, where appropriate, recovery of the solvent used, a uniform layer of aminoplast and nitrocellulose remains on the paper. In some cases, a very small amount of a plasticiser ensures that the layer thus formed is homogeneous and flexible. The best results are obtained with mixtures containing from 4 to 6 parts of nitrocellulose per 10 parts of the mixture, the remainder consisting of the aminoplast.

As the curable aminoplast, a condensation product of formaldehyde with melamine or, preferably, with urea is advantageously used. Urea-formaldehyde resins which are soluble in alcohol give the best results. Thus, the coating according to the present invention may be prepared with a butanol solution containing from 50–60% of a condensation product of urea with formaldehyde, with which the desired amount of nitrocellulose is mixed. Instead of butanol, it is also possible to prepare solutions in, for example, ethyl alcohol or methyl ethyl ketone.

The aminoplast used may be prepared by known methods described, for example, in British Pat. No. 483,399 or in Volume 3, page 482 of Ullmanns Enzyklopadie der technischen Chemie (Ullmann's Encyclopaedia of Industrial Chemistry). As thermosetting aminoplast it is also possible to use urea-formaldehyde resins containing a varying amount of alkyd resins to make the coatings more flexible.

The mixture to be used according to the invention can easily be prepared by simple addition of a solution of nitrocellulose to the solution of the chosen aminoplastics. A nitrated cellulose containing about 11% of nitrogen, that is to say dinitrocellulose or gun-cotton, is advantageously used as the nitrocellulose. The mixture obtained can thereafter, if necessary, be diluted, for example with acetone or methyl ethyl ketone, in order to arrive at the desired viscosity. It is also possible to add a small amount of a plasticiser, for example from 0.3 to 0.8% of octyladipate, to the mixture, so that the layer formed is not brittle.

The solution of the aminoplast–nitrocellulose mixture can be applied to the paper (or to the film of regenerated cellulose) which forms the substrate of the transfer sheet, by any appropriate means, preferably by photogravure. The pattern or design to be transferred may then be printed on the layer thus formed by any appropriate means (e.g. rotagravure, intaglio gravure, photogravure or offset).

In order to protect the pattern after transfer, for example against abrasion, it is also possible to coat a protective varnish of an acrylic resin (e.g. acrylonitrile or a methacrylate) or a varnish of the same characteristics as the inks constituting the patterns to be transferred over the coating of nitrocellulose and aminoplastics. Such a protective varnish can consist of a synthetic resin in the form of an emulsion.

The inks applied to the intermediate layer and which form the designs or patterns to be transferred must contain colouring agents which do not migrate into the definitive carriers, which show good fastness to the action of light, and which are transparent where colours are to be superposed, so that the shades obtained after transfer are not modified as a result of the opacity of one or more of the constituents.

On the other hand, where a transfer onto a definitive carrier which is to be transparent is envisaged, the transferred patterns can be rendered opaque by printing a white ink as the last layer onto the patterns carried by the transfer sheet.

Especially in the case where the definitive carrier consists of a polymer or copolymer of vinyl chloride, inks consisting of a pigment, a vinyl resin, for example a vinyl chloride polymer or copolymer, for example a copolymer of 85% of vinyl chloride and 15% of vinyl acetate, or of 83% of chloride and 17% of acetate, and a solvent or mixture of organic solvents, will preferably be used.

As pigments, pigment preparations based on generally organic colouring agents of high molecular weight, finely dispersed and coated with vinyl resins, will preferably be used. The pigments may, for example, be azo pigments obtained by coupling or by condensation, anthraquinone, perinone, perylene, quinacridone, thioindigoid, dioxazine or phthalocyanine dyestuffs or any other similar organic pigments.

In certain cases, where the question of transparency does not arise, inorganic pigments may be advantageously used. This is the case with white, where a pigment based on titanium oxide is preferably used or the metallised pigments which generally contain a more or less fine aluminium powder as the pigment. In the pigment preparations to be used for the preparation of the inks, these pigments are advantageously coated with a vinyl chloride polymer or copolymer; vinyl acetate/chloride copolymer (especially a copolymer of 85% of vinyl chloride and 15% of vinyl acetate) is especially suitable.

As appropriate pigment preparations, there may be mentioned those described in French Pat. No. 1,079,477 and more especially those which for example contain one or more dyestuffs of formula

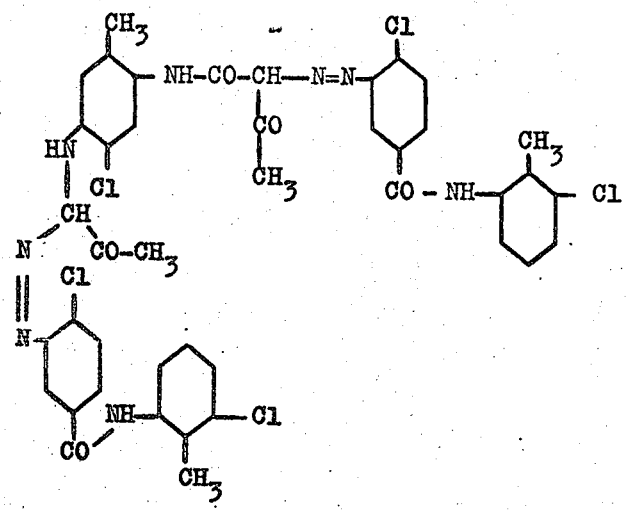

Yellow

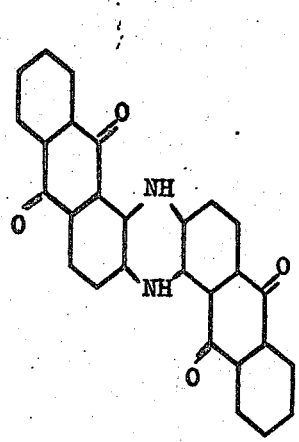

Blue

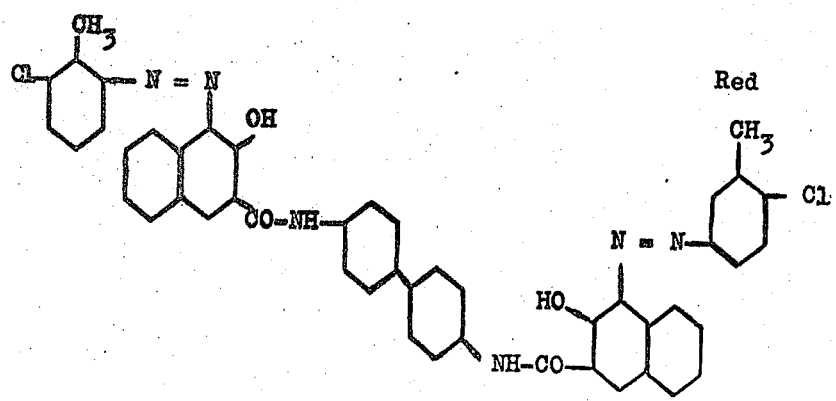

Red coated with Rhodopas AX, which is a copolymer of vinyl chloride and vinyl acetate.

To prepare the inks, the most varied organic solvents can be used, for example, aromatic or non-aromatic hydrocarbons, ketones, esters or alcohols. Preferably, solvents or mixtures of solvents having boiling points less than 125°C will be used. Between 5 and 20% of the pigment preparation can be extended with 5 to 15% of vinyl acetate chloride copolymer in 90 to 65% of solvent, and the ink thus obtained can be applied to the intermediate coating to form any desired patterns or designs. The ink may be applied by the usual techniques, that is to say by printing by means of engraved inking rollers.

After drying, a paper is obtained which on one of its faces carries a multi-colour film of vinyl resin, separated from the paper carrier (and hence easily detachable) by a layer immediately underneath, consisting of a mixture of nitrocellulose and a curable aminoplast, preferably a condensation product of urea with formaldehyde. The thickness of the transferable film can vary; good results are achieved with films of 0.05 mm, but thicker films, for example films of 0.8 to 1.2 mm, can also be easily detached. In general, the thickness of the film will lie in the range of from 0.05 to 1.00 mm.

The last inking roller can, if a non-transparent print is required, be provided with an opaque ink, for example an ink containing 10% of titanium oxide coated with 10% of Rhodopas AX and 6% of Vinylite VMCH or VYHH (vinyl chloride-vinyl acetate copolymer compositions), 10% of toluene and 64% of methyl ethyl ketone. The inks can, for example, be prepared as follows:

12 parts of a dispersion containing 50% of the dyestuff of formula

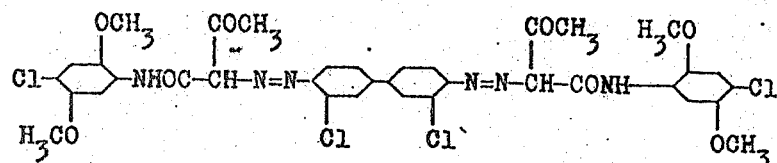

in 50% of a copolymer prepared from 85% of vinyl chloride and 15% of vinyl acetate (the average size of the particles of the indicted dyestuff in the dispersion being less than 0.5 micron) are mixed, with good stirring, with 5 parts of the said copolymer of vinyl chloride and vinyl acetate (vinyl acetate-chloride), 5 parts of the resin obtained by condensation of cyclohexanone with formaldehyde and sold by Farbenfabriken BAYER under the name of "Kunstharz AFS," 10 parts of toluene and 68 parts of methyl ethyl ketone. A red ink is obtained by following the same procedure but using a mixture of 8 parts of the dispersion containing 40% of the dyestuff

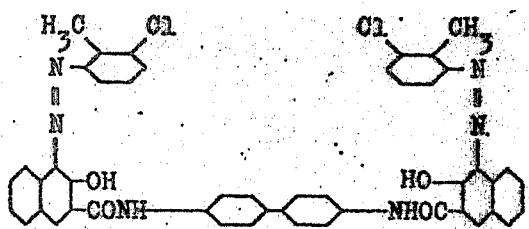

in 60% of the said copolymer, and 2 parts of the dispersion containing 45% of the dyestuff

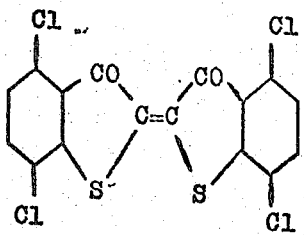

in 55% of the same copolymer (the two dispersions having an average particle size of dispersed pigment of less than 0.5 microns).

Using the transfer sheets of the present invention, all articles made of vinyl resins, especially bottles of various shapes, tubes, films or strips of polyvinylchloride vinyl chloride/ vinyl acetate copolymers can easily be printed; the films or strips to be printed can also be in the form of metal sheets or woven fabrics coated with polymers or copolymers of vinyl chloride or aluminium foils lacquered with such polymers. If it is desired not to print articles made of vinyl chloride polymers but articles made of polystyrene, the detachable layer of the carriers according to the present invention may be coated with a layer of an acrylic resin; this can, for example, be done by means of a solution of the acrylic resin, e.g. polymethylmethacrylate, in a mixture of organic solvents, e.g. methyl ethyl ketone and methyl isobutyl ketone.

Transfer sheets according to the present invention which are of especial interest are those which have an aluminium foil (preferred thickness 0.001 to 0.1 mm) adhering to the detachable film, that is to say to the pigmented layer; this thin aluminium foil carries on its reverse side, that is to say on the face which is not in contact with the pigmented layer, a coating either of a vinyl chloride polymer or copolymer or of an acrylic resin, preferably polymethylmethacrylate or of a polyamide. This coating makes it possible to transfer the aluminium foil, accompanied by the pigmented and detachable layer, onto various articles, for example onto articles made of vinyl chloride polymers or copolymers (if the coating itself consists of a polymer of a copolymer of vinyl chloride), onto polystyrene articles (if the coating consists of an acrylic resin) and even onto polyolefine articles, for example polyethylene objects (if the coating which covers the aluminium foil consists of a polyamide).

Instead of using the said transfer sheets to print articles, it is also possible to use them as a base on which certain materials (e.g. imitation leathers, more or less thick layers of polymers which may or may not be covered with woven fabrics, or irregular fibre assemblies of the "non-woven" type) are prepared. Thus it is possible to coat a transfer sheet according to the present invention with a relatively thick layer of a plastisol based on a vinyl chloride polymer, for example, in a mould, and, after gelling, to separate the paper from the film of polymer formed; this film carries with it the part of the transfer sheet which was separated from the paper by the layer of nitrocellulose and aminoplast. Thus more or less thick films of vinyl chloride polymers or copolymers carrying all the desired patterns, designs and prints are obtained in a single operation, that is to say directly during their manufacture.

One of the important advantages of the method of dyeing and printing by means of the transfer sheets of the present invention is that it allows industrial establishments not equipped with printing machines to produce prints by transfer onto any appropriate object. A further advantage resides in the possibility of obtaining very thin foils, films, strips or ribbons which carry prints of very high precision. Furthermore, the transfer process may be carried out dry, by simple heating, and avoids the use of solvents which in the conventional printing process are a source of numerous difficulties such as attack of the thin films by residual solvents, objectionable odours, loss of the properties of the film produced and blocking. It is furthermore possible, using the new transfer sheets of the present invention, not only to produce prints on the front and the back in one or two operations but also successively to transfer different designs without loss of material, by preparing prior to the manufacture of the polyvinylchloride object, a coil of paper consisting of the various designs to be reproduced, these being wound up successively and joined up to follow each other.

The new transfer sheets of the present invention obviate the storing of finished, and hence expensive, products, and substitute storing printed paper (resulting in a reduction of the value of stocks); they also dispense with wastage of finished materials during the printing of these on a printing machine. Finally, the quality of the prints obtained is better, the sharpness and quality of register of the colours being excellent by virtue of the dimensional stability of the paper or regenerated cellulose base.

The sheets according to the invention can be applied equally well to unsupported films as to coated fabrics and even to moulded articles.

The following Examples illustrate the invention; the parts and percentages are, unless otherwise stated, by weight and the temperatures in degrees centigrade The accompanying drawing is also a graphic illustration of the disclosed invention.

EXAMPLE 1

One of the faces of a sheet of a kraft type of paper is coated with a varnish of the following composition:

| | |
|---|---|
| Plastopal AT of BASF | 21 parts |
| nitrocellulose collodion | 49 parts |
| methyl ethyl ketone | 30 parts | in such a way that after evaporation of the solvent and drying at 90°, 5 g of dry product remain per m².

Coloured patterns are printed onto the face coated in this way, by means of several inking rollers, using inks of the following composition:

12% of a pigment preparation, for example containing equal parts of an organic pigment and of a copolymer of vinyl chloride and vinyl acetate (of the type MIKROLITHE K of Ciba-Geigy AG), 6% of a copolymer of vinyl chloride and vinyl acetate, 10% of toluene and 72% of methyl ethyl ketone.

After drying, a transfer sheet according to the present invention is obtained. The urea-formaldehyde/nitrocellulose layer immediately below allows the film to be transferred to be easily separated from its paper carrier.

Once the transfer sheet has thus been prepared, the transfer can be effected by application to the definitive carrier, the application being stabilised by synchronously driving the temporary sheet and the definitive carrier. There is thus no need for any register control for a multicolour print to be obtained at this stage of the manufacture. The actual transfer is effected by application of heat, pressure, or both together. The process may be carried out, at temperature preferably not exceeding 120° to 150°C, either between rollers if the transfer is effected by unrolling, or between plates, or in moulds or shaping devices if the transfer takes place individually or on series of a specific number of objects. The temperature employed is the effective temperature of the material to be printed. It is obvious that in high speed operations, the temperature of the calender can be higher provided that it does not exceed the limits indicated above. Application of heat is in general followed by cooling to ambient temperature, which can immediately be followed by easy separation of the paper substrate.

It is thus possible to print, with or without a protective varnish, flat designs in solid colours, especially with metallised inks, which avoids colouring the definitive carrier in bulk. The transfer process makes it possible to print objects which would be difficult to pass through conventional printing machines because of their rigidity, or in some cases, because of their lack of rigidity.

EXAMPLE 2

One of the faces of a highly calendered paper is coated on a printing machine, using the following varnishes:

| | |
|---|---|
| Varnish No. 1 | |
| condensation product of urea with formaldehyde (type Plastisol AT of BASF) | 21 parts |
| nitrocellulose containing 11.4% of nitrogen | 20 parts |
| octyl adipate | 2 parts |
| isopropyl alcohol | 10 parts |
| methyl ethylketone | 47 parts |
| Varnish No. 2 | |
| vinyl acetate/chloride copolymer obtained from 85% of vinyl chloride and 15% of vinyl acetate (molecular weight: about 9000) | 15 parts |
| methyl ethyl ketone | 85 parts |

These two varnishes are applied by a photogravure system, the first being applied with a screen of 120 lines (use viscosity of the varnish, 30 seconds in a 4 mm Ford cup), and the second with a screen of 150 lines (use viscosity of the varnish, 20 seconds in a 4 mm Ford cup), corresponding to a dry coating per m² of about 4 to 6 grams for the first varnish and 0.8 to 1.5 grams for the second.

The material is dried and coloured patterns are printed on the face covered in this way by means of several inking rollers, using inks of the following composition:

12% of a pigment preparation, for example Microlithe K,
6% of a vinyl chloride/vinyl acetate copolymer,
10% of toluene and
72% methyl ethyl ketone.

After drying, a transfer sheet according to the present invention is obtained. An approximately 1 mm layer of the plastisol of the following composition is applied to the sheet thus obtained:

60 parts of a vinyl chloride polymer, for example of Geon 121 of Messrs. Goodrich,
37 parts of dioctyl phthalate, and
3 parts of epoxidised soya oil, with an epoxy oxygen content of 6 to 6.5 and a viscosity of 500 to 600 centipoises (for example Advaplast 39),
2 parts of stabilisers (for example 1.5 part of Advastab B-26 and 0.5 part of Advastab CH 300, these being complex stabilisers containing barium and cadmium salts),
10 parts of barium sulphate and
5 parts of titanium oxide.

Thereafter the whole is placed in an oven for 5 minutes at 170° to gel the plastisol.

After gelling, the sheet of paper which forms the base of the transfer sheet can be easily removed before or after cooling, and a film of polyvinyl chloride is thus obtained to which the print originally carried by the transfer sheet remains firmly attached.

In place of methyl ethyl ketone and toluene, it is also possible to use isopropyl alcohol or another mixture of appropriate solvents in the present Example.

It goes without saying that the formula of the plastisol can also be modified both qualitatively and quantitatively without substantially affecting the result. In place of polyvinyl chloride, it is, for example, possible also successfully to use vinyl chloride copolymers, for example those containing a generally low proportion of vinyl acetate or vinylidene chloride.

As pigment preparations which can be used in the preceding examples, there will be mentioned:

a dispersion of 50% of copper phthalocyanine in 50% of vinyl acetate/chloride copolymer, (i.e. a copolymer prepared from 85% of vinyl chloride and 15% of vinyl acetate) (the pigment particles in this dispersion having an average size of less than 0.5 micron);

a dispersion of 40% of titanium dioxide in 60% of vinyl acetate/chloride copolymer as above and a dispersion of 45% of tetrachloro-thioindigo in 55% of the same copolymer (all these dispersions having an average particle size of the dispersed pigment of less than 0.5 micron).

The transfer sheet can be prepared either on a separate machine or at the same time as the print is prepared. The choice of one or the other procedure depends simply on the number of colours for which the printing machine is equipped. Thus, on a 6 colour machine, it is possible, using the two above varnishes and 4 pigment preparations, to prepare a transfer sheet carrying a detachable 4 colour print, the prior coating of the paper with the two varnishes forming respectively the layer immediately underneath and a protective layer, and being capable of production on the machine on which the actual printing is carried out because two heads remain available.

EXAMPLE 3

The procedure of Example 2 is followed, but after drying the print comprising coloured patterns, a very thin aluminium foil (0.01 mm) carrying a coating of a vinyl chloride/vinyl acetate copolymer on one of its faces is applied to the sheet thus obtained, and the other face of the aluminium foil is then coated with one of the following solutions (depending on the use to which it is intended to put the transfer sheet), and the material is dried:

| Solution A: | |
|---|---|
| polymethyl methacrylate | 30 parts |
| mixture of ethyl methyl ketone and isobutyl methyl ketone | 70 parts |
| Solution B: | |
| mixture of 20 parts of Versamid 950 and of 20 parts of Versamid 930, these being polyamide resins obtained by condensation of diamines with linoleic acid | 20 parts |
| trichlorethylene | 49 parts |
| isopropanol | 21 parts |
| Solution C: | |
| vinyl acetate/chloride copolymer obtained from 85% of vinyl chloride and 15% of vinyl acetate (molecular weight: about 900) | 15 parts |
| polymethyl methacrylate | 5 parts |
| methyl ethyl ketone | 70 parts |
| toluene | 10 parts |

Three types of transfer sheets are thus obtained, which can be used to transfer a multi-colour print onto various carriers: those obtained with the aid of solution A allow the print to be transferred onto polystyrene articles, those obtained with the aid of solution B can be used on polyethylene, whilst the carriers obtained with the aid of solution C must be employed for transfers onto polymers and copolymers of vinyl chloride.

We claim:

1. A transfer sheet for transfer printing which comprises a paper or regenerated cellulose substrate carrying on at least one of its faces a detachable film layer containing a pattern or design, said film being separated from the substrate by a layer consisting essentially of a mixture of nitrocellulose and an aminoplast selected from the group consisting of urea-formaldehyde and melamine-formaldehyde resins said layer containing 40 to 60% nitrocellulose.

2. A transfer sheet as claimed in claim 1 wherein the detachable film comprises a pigmented vinyl resin.

3. A transfer sheet as claimed in claim 2 wherein the vinyl resin is polyvinylchloride or a vinyl chloride/vinyl acetate copolymer.

4. A transfer sheet as claimed in claim 2 wherein the vinyl resin contains from 10 to 50% by weight of very finely divided organic pigments.

5. A transfer sheet as claimed in claim 1 wherein the design or pattern is multicoloured.

6. A transfer sheet as claimed in claim 1 wherein the aminoplast is a urea-formaldehyde resin.

7. A transfer sheet as claimed in claim 1 wherein the nitrocellulose is dinitrocellulose or gun-cotton.

8. A transfer sheet as claimed in claim 1 which comprises a sheet of paper coated with 1–10 g per square meter of the nitrocellulose-aminoplast mixture.

9. A transfer sheet as claimed in claim 8 wherein the amount of the nitrocellulose-aminoplast mixture is 2 to 7 grams per square meter.

10. A transfer sheet as claimed in claim 1 wherein the nitrocellulose-aminoplast layer contains a minor amount of a plasticizer.

11. A transfer sheet as claimed in claim 10 wherein the plasticizer is present in an amount of from 0.3 to 0.8% based on the weight of the nitrocellulose-aminoplast mixture.

12. A transfer sheet as claimed in claim 10 wherein the plasticizer is octyladipate.

13. A transfer sheet as claimed in claim 1 wherein the aminoplast contains an alkyd resin.

14. A transfer sheet as claimed in claim 1 wherein the substrate comprises a highly calendered kraft paper.

15. A transfer sheet as claimed in claim 1 wherein the detachable film layer is coated with a layer of an acrylic resin.

16. A transfer sheet as claimed in claim 15 wherein the acrylic resin is polymethylmethacrylate.

17. A transfer sheet as claimed in claim 1 wherein the detachable film layer carries an aluminum foil which is coated on its side opposite that side adjacent to the detachable film layer with a vinyl chloride polymer or copolymer, an acrylic resin or a polyamide.

18. A transfer sheet as claimed in claim 1 which comprises a layer of a protective varnish between the nitrocellulose-aminoplast layer and the detachable film layer.

19. A transfer sheet as claimed in claim 18 wherein the varnish comprises an acrylic resin or a vinyl resin.

* * * * *